(12) United States Patent
Harlan

(10) Patent No.: US 6,188,187 B1
(45) Date of Patent: Feb. 13, 2001

(54) APPARATUS AND METHOD OF REGULATING THE SPEED OF A DC BRUSHLESS MOTOR

(75) Inventor: George H. Harlan, Hanson, MA (US)

(73) Assignee: Nidec America Corporation, Torrington, CT (US)

(*) Notice: Under 35 U.S.C. 154(b), the term of this patent shall be extended for 0 days.

(21) Appl. No.: 09/131,046

(22) Filed: Aug. 7, 1998

(51) Int. Cl.[7] .................................................. H02K 23/00
(52) U.S. Cl. ........................ 318/254; 388/811; 388/910; 318/439
(58) Field of Search ..................... 388/811, 804, 388/819, 829, 910; 318/811, 254, 439, 138

(56) References Cited

U.S. PATENT DOCUMENTS

| | | | |
|---|---|---|---|
| 3,663,876 | 5/1972 | McBride, Jr. et al. | 318/221 D |
| 4,319,175 | 3/1982 | Leenhouts | 318/696 |
| 4,488,101 | 12/1984 | Studtmann | 318/800 |
| 4,511,829 | 4/1985 | Wisnieski | 318/317 |
| 4,755,728 | 7/1988 | Ban | 318/254 |
| 4,952,853 | 8/1990 | Archer | 318/254 |
| 5,005,100 | 4/1991 | Owen | 361/35 |
| 5,388,176 * | 2/1995 | Dykstra et al. | 388/811 |
| 5,502,361 * | 3/1996 | Moh et al. | 388/811 |
| 5,606,232 | 2/1997 | Harlan et al. | 318/138 |
| 5,625,424 | 4/1997 | Conner et al. | 348/743 |
| 5,640,073 | 6/1997 | Ikeda et al. | 318/439 |

* cited by examiner

Primary Examiner—David S. Martin
(74) Attorney, Agent, or Firm—Cummings & Lockwood

(57) ABSTRACT

A control circuit for regulating the rotational speed of a DC brushless motor includes an electrical conduction switch having an input, an output and a control terminal for passing a motor supply signal to a DC brushless motor. A voltage averaging circuit generates an averaged signal indicative of the average voltage level being supplied to the motor. The averaging circuit informs an error amplifier to modulate the motor supply signal to compensate for changes in the voltage level of the motor supply signal in order to maintain the rotational speed of the motor at a generally constant rpm. The control circuit takes advantage of the motor windings and rotor mass as a filter circuit to smooth changes in current drawn by the motor, and to further maintain the rotational speed of the motor.

20 Claims, 3 Drawing Sheets

APPARATUS AND METHOD OF REGULATING THE SPEED OF A DC BRUSHLESS MOTOR

The present invention relates generally to a motor controller, and more particularly to a controller for regulating the rotational speed of a DC brushless motor.

BACKGROUND OF THE INVENTION

Control circuits are known for controlling DC brushless motors, such as, for example, regulating the rotational speed of DC brushless fan motors that cool the interior of computers. One problem with DC brushless fan motors is that such fan motors traditionally have had a narrow usable input range. Fan speed and input current are approximately proportional to input voltages. Thus, if the input voltage from an unregulated source such as a battery were used to power a DC brushless fan, such as a typical 24 volt nominal battery, the voltage would vary from about 28 volts in float state to about 21 volts in discharged state. This change would cause a DC brushless fan rated at a nominal 3500 RPM to vary as much as about 1000 RPM over the above-mentioned range of battery voltage. Such a large variation in RPM means that the fan is not properly cooling a computer at the low-end of the RPM range, and that power is being wasted at the high-end of the RPM range.

Some DC brushless fan users have multiple input source voltages that their equipment is expected to operate from, with 24 volt and 48 volt systems being the most common. Such multiple source voltages pose the same problem in resultant RPM variation in a DC brushless fan motor as does a single input voltage source whose voltage level widely varies. There is a need to provide a DC brushless fan motor having a high input range with relatively little variation in motor rotational speed. For example, in the telecommunications industry, there is a need to provide a DC brushless fan motor having an input range of about 20–60 volts with little variation in motor rotational speed. However, other input voltage ranges may be provided for other motor applications.

Linear regulators have been used to regulate DC brushless fan rotational speed. However, the linear regulator approach poses an efficiency problem. A DC brushless fan that draws 18 watts at 21 volts will draw almost 27 watts when operating at 28 volts, and 54 watts at 56 volts input, with the increase in power draw having to be dissipated as heat.

Pulse-width modulation (pwm) has also been used in the prior art to regulate motor speed. One method commonly used is to pulse-width modulate the commutation transistors to the DC brushless motor. This employment of pulse-width modulation reduces the dissipation of energy involved with changing motor speed. However, pulse-width modulating the commutation transistors does not permit large changes in input voltage without widely-varying the rotational speed of the DC brushless motor. This method is most commonly used in thermal DC brushless fans to reduce DC brushless fan speed at low temperatures. The speed variation is unfortunately even wider than that of the non-speed controlled type, and clamp dissipation is still relatively high.

Another pwm approach is to use a full bridge driver. This involves placing a bipolar motor winding between the legs of four switching transistors and controlling the timing of the pwm modulator and commutation logic to regulate motor current. Wide input voltage ranges are possible with high efficiency. A well designed full bridge driver can regulate motor speed over a better than 3:1 range of input voltage. The chief drawbacks are complicated logic and the difficulties of driving the four switching transistors without cross conduction through the series connected pairs. Although many manufacturers offer integrated full bridge devices, most suffer from a limitation of current and/or voltage.

Another approach is to employ a pwm switching voltage regulator to accommodate a wide range of input voltages without widely varying the rotational speed of the motor. However, this requires relatively bulky filter inductors and capacitors.

Of the above-mentioned pwm approaches, the pwm voltage regulator regulates motor voltage. The other methods typically regulate motor current. Voltage regulation is preferred to minimize variations in desired DC brushless motor speed. In other words, the variation in motor speed from motor to motor for a given current is greater than the variation in motor speed for a given voltage. Additionally, motor torque is a function of motor current. Therefore, if motor current is reduced in order to reduce motor speed to a low value, the motor torque becomes low. This means that the motor speed is sensitive to applied load (i.e. back pressure). This sensitivity to back pressure results in large speed deviations from the desired value. Motor-starting at low desired speeds is also a problem in that if the motor current is set too low then the motor will not be able to overcome the magnetic detents used to position the rotor away from the null point.

The invention uses the advantages of a pwm voltage regulator, wide speed control, wide input voltage range capability, and high power efficiency while eliminating the large filtering components such as bulky capacitors and inductors interfacing the voltage regulator with a DC brushless motor.

It is therefore an object of the present invention to provide a DC brushless motor regulator which handles a relatively wide range of input voltages with little variation in the rotational speed of the motor.

It is another object of the present invention to provide a DC brushless motor regulator that eliminates the relatively bulky filter capacitors and inductors interfacing the regulator and motor.

The above and other objects and advantages of this invention will become more readily apparent when the following description is read in conjunction with the accompanying drawings.

SUMMARY OF THE INVENTION

According to one aspect of the present invention a control circuit for regulating the rotational speed of a DC brushless motor is provided. The control circuit includes an electrical conduction switch having an input, an output and a control terminal for passing a motor supply signal to a DC brushless motor from a voltage across first and second terminals of a DC voltage source. The input terminal of the switch is to be coupled to the first terminal of the DC voltage source, and the output terminal of the switch is to be coupled to the first terminal of the DC brushless motor. A voltage averaging circuit is provided having first and second input terminals and an output terminal for averaging the voltage level of the motor supply signal. The first input terminal of the voltage averaging circuit is coupled to the output of the switch and the second terminal of the voltage averaging circuit is to be coupled to the second terminal of the voltage source. A differential amplifier has first and second input terminals and an output terminal for generating a differential signal having a voltage level indicative of the difference in voltage between the voltage level of the averaged signal and a reference voltage. The first input terminal of the differential amplifier is to be coupled to a voltage reference potential, and the second input terminal of the differential amplifier is coupled to the output terminal of the voltage averaging circuit. A pulse-width modulator (pwm) has an input terminal and an output terminal, the input terminal of the pwm is coupled to the output terminal of the differential amplifier, and the output terminal of the pwm is coupled to the control terminal of the switch such that the pwm turns on and off the switch at a rate indicative of the voltage level of the differential signal to provide a motor supply signal having a substantially constant voltage level, whereby the motor windings serve as an inductor filter to smooth changes in current and the rotor mass of the motor serves to smooth the rotational speed of the motor.

According to another aspect of the present invention, a control circuit for regulating the rotational speed of a DC brushless motor is provided. The control circuit includes first means to be coupled to an electrical power source for switchably passing a motor supply signal to a DC brushless motor. A second means is coupled to an output of the first means for generating an averaged signal by averaging a voltage level of the motor supply signal. A third means is coupled to an output of the second means for generating a differential signal having a voltage level indicative of the difference in voltage between the voltage level of the averaged signal of the second means and a reference voltage, and a fourth means turns on and off the first means in response to the value of the differential signal in order to provide a substantially constant motor supply voltage level, whereby the motor windings serve as an inductor filter to smooth changes in current and the rotor mass of the motor serve to smooth the rotational speed of the motor.

According to yet another aspect of the present invention, a method of regulating the rotational speed of a DC brushless motor is provided. A motor supply signal is switchably passed from an electrical power source to a DC brushless motor. The voltage level of the motor supply signal is averaged to form an averaged signal. A differential signal is generated having a voltage level indicative of the difference in voltage between the averaged signal and a reference voltage. The motor supply signal is modulated in response to the value of the differential signal in order to provide a substantially constant voltage level of the motor supply signal, whereby the motor windings serve as an inductor filter to smooth changes in current and the rotor mass of the motor serve to smooth the rotational speed of the motor.

DETAILED DESCRIPTION OF THE PREFERRED EMBODIMENT

Figure 1:
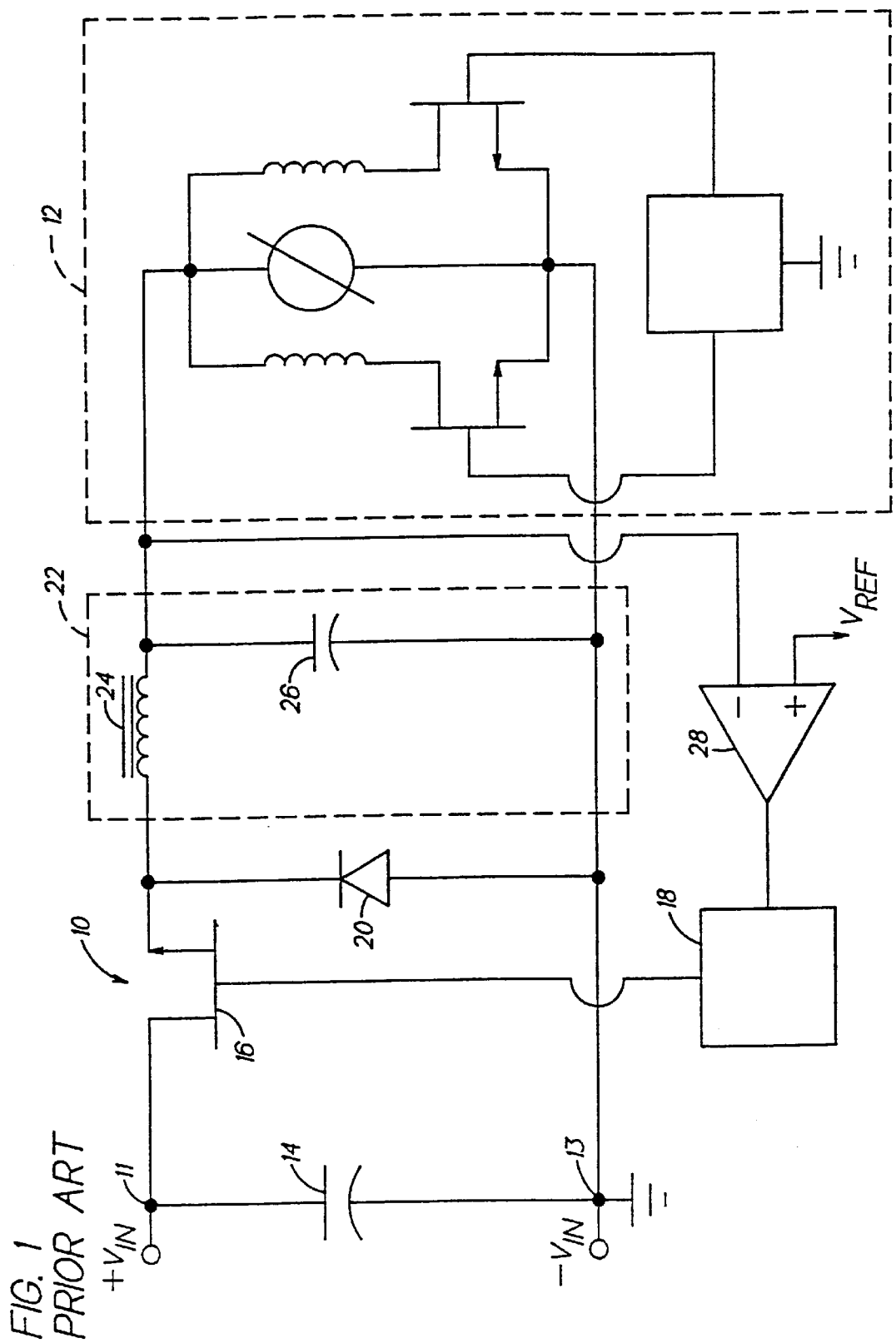
FIG. 1 illustrates schematically a prior art electrical circuit of a pwm voltage regulator employing filter capacitors and inductors interfacing the regulator to a DC brushless motor.

A prior art pwm voltage regulator will first be explained as background to the pwm voltage regulator embodying the present invention. Referring now to the prior art of FIG. 1, a pwm voltage regulator is indicated generally by the reference number 10 and is employed to control the rotational speed of a DC brushless motor 12 enclosed by dashed lines. The regulator 10 includes a positive terminal 11 and a negative terminal 13 for receiving a regulator DC input voltage from a power source (not shown). The pwm voltage regulator 10 includes an input filter capacitor 14, a pwm power transistor 16 that is switched on and off by a pwm modulator 18, a catch diode 20, and an output filter circuit 22 enclosed by dashed lines which includes an output filter inductor 24 and an output filter capacitor 26. The output filter inductor 24 and the output filter capacitor 26 are typically rather bulky, thereby imposing design constraints in relation to the increasing demand for smaller voltage regulators that are either separate from or incorporated in DC brushless motors. The demand for smaller regulated motors is particularly high in the computer industry which uses DC fan units incorporating regulated DC brushless motors for cooling electronic components.

The output filter circuit 22 smoothes a pwm waveform generated by the pwm modulator 18 and the switching transistor 16 into a motor supply signal having an average DC voltage level. This average DC voltage level of the DC motor input signal determines the rotational speed of the motor 12. In order to maintain the rotational speed of the DC brushless motor at a generally constant revolutions per minute (rpm), feedback is provided to the regulator 10. To provide feedback, the voltage level of the DC motor input signal is received at the inverting input of a differential or error amplifier 28 and compared with a reference voltage $V_{ref}$ which is provided at the non-inverting input of the amplifier 28. The output of the error amplifier 28 is the difference between the two inputs to the error amplifier 28, and is multiplied by the gain of the error amplifier 28. This error voltage output by the error amplifier 28 is provided as a feedback signal to the pwm modulator 18 which adjusts the width of the pulse or modulator signal generated by the pwm modulator 18. The modulator signal adjusts the switching on and off time of the transistor 16 in order to modulate the regulator input signal, which in turn adjusts the average voltage level of the motor input signal after being smoothed by the filter circuit 22, in order to compensate for deviations in the motor input voltage level sensed by the feedback circuitry. The compensation thus tends to maintain the voltage level of the motor input signal constant despite changes in the voltage level of the regulator input signal or changes to the load in order that the rotational speed of the motor 12 remains relatively constant. As previously mentioned, a drawback with the prior art circuit is that the output filter inductor and capacitor 24, 26 are relatively bulky and therefore require considerable mounting space in the regulator circuitry. The large space requirement hampers the growing demand to incorporate DC brushless motors and regulator circuitry in ever smaller spaces, such as the relatively small spaces allotted for regulated DC cooling fan units within portable computers.

Figure 2:
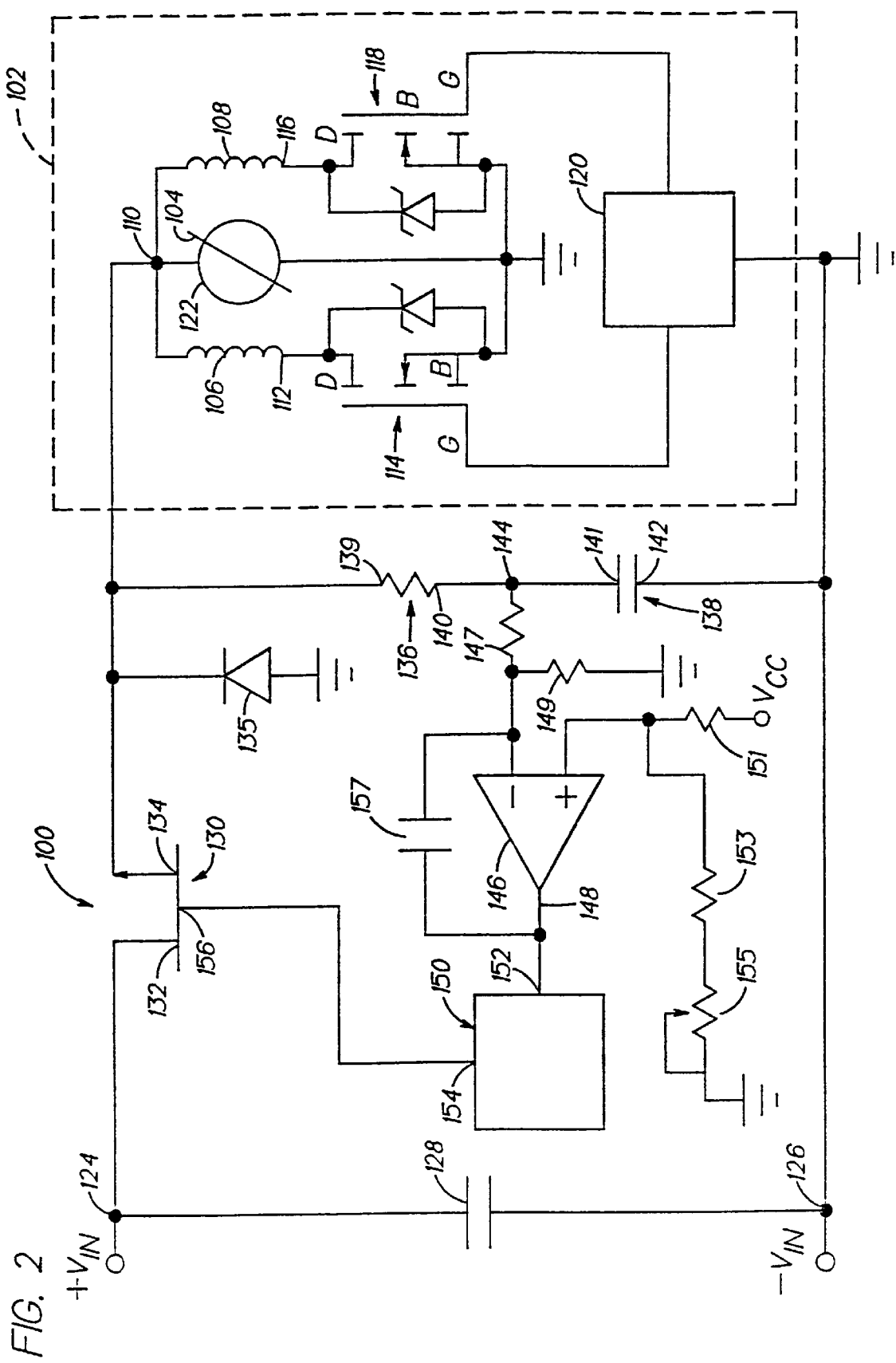
FIG. 2 illustrates schematically an electrical circuit of a pwm voltage regulator embodying the present invention which employs the DC brushless motor windings and rotor mass as a substitute for additional filter and inductors and capacitors.

Turning now to FIG. 2, a pwm voltage regulator circuit 100 is employed in a center tap modulation approach for regulating the rotational speed of a DC brushless motor 102 enclosed by dashed lines. The motor 102 is a conventional DC brushless motor which may be coupled to a fan 104 used to cool a surrounding area such as the inside of a computer. The motor 102 includes first and second directional windings 106, 108, respectively. Each of the windings 106, 108 has a first end coupled to an input terminal or center tap 110 of the motor. A second end 112 of the first winding 106 is coupled to ground potential via a first commutation switching transistor 114 and a second end 116 of the second winding 108 is likewise coupled to ground via a second commutation switching transistor 118. The switching transistors 114, 118 are alternately turned on and off by means of a conventional commutator logic circuit 120. A rotor 122 is caused to rotate, and in turn rotate the fan 104 coupled thereto, by interacting with an electromagnetic field generated by commutated current flowing through the first and second windings 106, 108.

The voltage regulator circuit 100 includes a positive input terminal 124 and a negative input terminal 126 for receiving thereacross a DC regulator input signal from a power source (not shown). An input capacitor 128 is coupled across the positive and negative input terminals 124 and 126. Means for switchably passing a motor supply signal to the DC brushless motor 102 includes, for example, a pwm power or switch or transistor 130, such as an npn bipolar junction transistor (BJT). The transistor 130 has its collector 132 coupled to the positive input terminal 124 and its emitter 134 coupled to an input voltage terminal of the motor 102 at 110. A catch diode 135 has its cathode coupled to the emitter 134 of the transistor 130 and its anode coupled to ground potential. Means for averaging the voltage of the motor supply signal includes a series connected resistor 136 and capacitor 138 which cooperate to form a voltage integrator. The resistor 136 and the capacitor 138 are coupled between the emitter 134 of the transistor 130 and the negative input terminal 126. More specifically, the resistor 136 has respective first and second terminals 138, 140, and the capacitor 138 has respective first and second terminals 141, 142. The first terminal 138 of the resistor 136 is coupled to the emitter 134 of the transistor 130. The second terminal 140 of the resistor 136 is coupled to the first terminal 141 of the capacitor 138 at a junction 144 where an averaged signal indicative of the average voltage level of the motor supply signal is generated, and the second terminal 142 of the capacitor 138 is coupled to the negative input terminal 126. Means for generating a differential signal having a voltage level indicative of the difference between the voltage level of the averaged signal and a reference voltage includes a high gain operational or error amplifier 146, such as a differential voltage amplifier. The error amplifier 146 has its inverting input coupled to the junction 144 via a resistor 147. The gain of the error amplifier 146 is preferably selected so that only millivolts of difference between the inverting and non-inverting inputs will drive the amplifier output to its extreme. A resistor 149 is coupled between the inverting input of the error amplifier 146 and ground potential. The non-inverting input of the error amplifier 146, which is fed the reference voltage, is coupled to a voltage $V_{cc}$ via a resistor 151. The non-inverting input is also coupled to ground via a series connected resistor 153 and potentiometer 155. An output 148 of the error amplifier 146 is coupled to a pulse-width modulator (pwm) 150 at an input 152. The pwm 150 is a means for turning on and off the transistor 130 to modulate the motor supply signal so that the motor supply signal is maintained at a substantially constant voltage level and, in turn, the motor 102 is maintained at a substantially constant rotational speed. A rolloff capacitor 157 is coupled between the inverting input and the output 148 of the error amplifier 146. An output 154 of the pwm 150 is coupled to a base 156 of the transistor 130.

Figure 3:
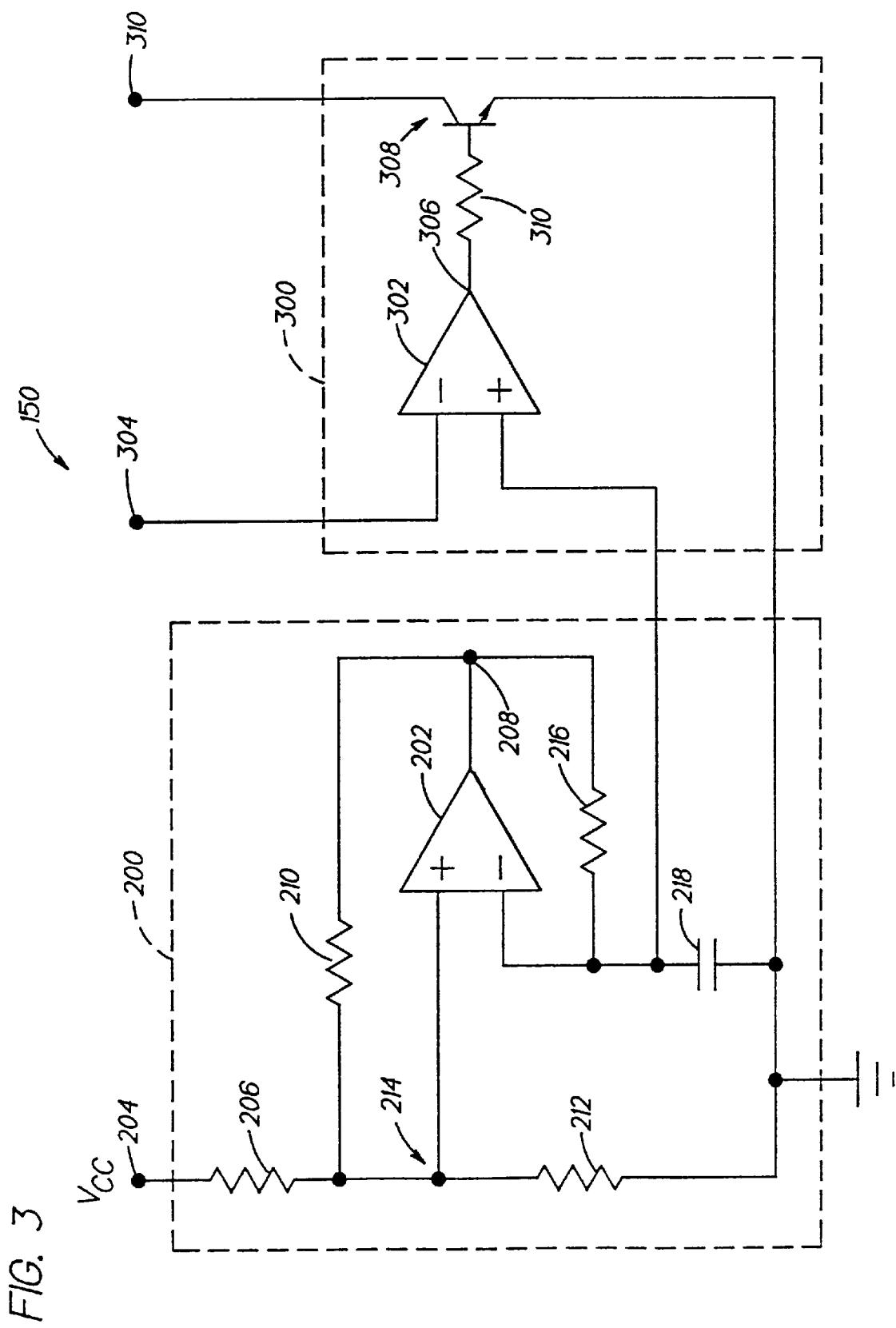
FIG. 3 illustrates schematically a pwm sub-circuit of the pwm voltage regulator of FIG. 2.

A preferred embodiment of the pulse width modulator 150 is illustrated in FIG. 3. The pwm includes an oscillator sub-circuit 200 and a driver sub-circuit 300 each enclosed by dashed lines. The oscillator 200 includes a comparator 202 having its non-inverting input coupled to a $V_{cc}$ source at 204 via a resistor 206. An output 208 of the comparator 202 is coupled to its non-inverting input via a resistor 210. A resistor 212 is coupled between the non-inverting input of the comparator 202 and ground potential. The resistors 206, 210 and 212 are coupled to one another at a junction 214. A timing resistor 216 is coupled between the output 208 of the comparator 202 and the inverting input of the comparator. A timing capacitor 218 is coupled between the inverting input of the comparator 202 and ground potential.

The driver sub-circuit 300 includes a comparator 302 having its non-inverting input coupled to the inverting input of the comparator 202 of the oscillator sub-circuit 200. The inverting input of the comparator 302 at terminal 304 receives the error voltage signal from the output 148 of the error amplifier 146 shown in FIG. 2. An output 306 of the comparator 302 is coupled to a base of a transistor 308 via a resistor 310. The transistor 308, which serves as a pwm driver transistor, is shown as an npn BJT, but may be an FET or other suitable transistor for driving the pulse width modulator. An emitter of the transistor 308 is coupled to ground potential and a collector of the transistor 308 is coupled at its output 310 to the base 156 of the power transistor 130 shown in FIG. 2.

Referring now to the operation of the pwm voltage regulator circuit 100 shown in FIG. 2, the regulator circuit 100 receives a DC regulator input signal across the positive and negative input terminals 124, 126 from a power source (not shown) such as a DC power supply or an AC source that is rectified into DC voltage. The DC regulator input signal is initially filtered by the input capacitor 128 to further smooth the input voltage signal and to remove any unwanted transient voltage fluctuations. The motor supply signal derived from the DC power supply is modulated by the combination of the pwm 150 and the transistor 130 to generate a motor supply signal having a predetermined average voltage level suitable for operating the motor 12 at a desired rotational speed. Because the rotational speed of the motor 12 is a function of the voltage level of the motor supply signal, it is important to maintain this voltage level at substantially the same value.

The pwm 150 sends a modulator signal to the base 156 of the switching transistor 130 to modulate the motor supply signal. The modulated motor supply signal present at the emitter 134 of the transistor 130 is the signal used to regulate the rotational speed of the motor 102. The voltage level of the modulated motor supply signal is averaged at the junction 144 by the series combination of the resistor 136 and the capacitor 138 to form an averaged signal, and is thus indicative of the average voltage level of the motor supply signal. The voltage level of the averaged signal is a function of the pulse width of the modulated motor supply signal.

The voltage level of this averaged signal at the junction 144 is reduced by the resistors 147, 149, and this reduced voltage level of the averaged signal is received at the inverting input of the error amplifier 146 and compared with a reference, such as $V_{ref}$ to generate a differential or error signal at the output 148 of the error amplifier 146. $V_{ref}$ is determined by the resistors 151, 153 and adjusted by the potentiometer 155. The reference voltage $V_{ref}$ is a fixed voltage level which is compared with the reduced voltage level of the averaged signal to determine if there is any deviation in the difference between the voltage level of $V_{ref}$ and the reduced voltage of the averaged signal representing the motor supply signal or voltage, and thus a tendency for the rotational speed of the motor 102 to change or drift over changes in input voltage to the pwm voltage regulator circuit 100. As an example, the voltage level of the averaged signal $V_m$ is selected as 12.75 volts, $V_{ref}$ is 0.25 volt and the resistors 147, 149 are selected to reduce the voltage level of averaged signal by a factor of 50 in order that $V_m=$ ((resistance of the resistor 147/resistance of the resistor 149)*$V_{ref}$)+$V_{ref}$=((50)*0.25)+0.25)=12.75 volts.

If there is a deviation between the ideal voltage $V_{ref}$ (i.e., 0.25 volt in this example) and that of the voltage level of the reduced averaged signal at the inverting input of the error amplifier 146, the error amplifier 146, in order to compensate for change in the voltage level of the motor supply signal (i.e., a deviation from 12.75 volts in this example), will generate an error signal at the output 148 of the amplifier 146 having a voltage magnitude proportional to the difference between the voltage levels present at the inverting and non-inverting inputs of the amplifier 146. When the reduced voltage level of the averaged signal drops slightly in relation to $V_{ref}$ because of, for example, a load increase or input voltage drop, the voltage level of the amplifier signal generated at the output 148 of the amplifier 146 will increase slightly. The increased voltage level of the amplifier signal will then be fed to the input 152 of the pwm 150 to slightly increase the duration or pulse width of the modulator signal generated at the output 154 of the pwm 150. The increased duration of the modulator signal is fed to the base 156 of the power transistor 130 to increase the pulse width or duration of the turn-on time of the transistor 130. The increased turn-on time thus increases the pulse width of the modulated motor supply signal present at the emitter 134 of the transistor 130 which is fed to the input voltage terminal 110 of the DC brushless motor 102. The increased duration or pulse width of the modulated motor supply signal raises the average voltage level of the motor supply signal, to compensate for the slight drop in the voltage level of the motor supply signal, thereby maintaining the rotational speed of the motor at a generally constant rpm. Conversely, if the reduced voltage level of the averaged signal increases slightly, the amplifier 146, the pwm 150 and the transistor 130 cooperate in a fashion opposite to that just described to decrease the pulse width of the motor supply signal for decreasing the average voltage level of the motor supply signal. The rolloff capacitor 157 is coupled across the error amplifier 146 to prevent the output of the error amplifier from stewing to its limits in response to $V_m$ changes by means of reducing the high frequency gain of the error amplifier 146 to the point that the pwm 150 can follow the error amplifier output. The catch diode 135 prevents the inductor current from decaying at a rapid rate and the voltage at the center tap 100 from falling below ground potential in order to maintain the average voltage at the center tap as the motor current is being commutated.

The pwm voltage regulator circuit just described is known to substantially maintain the rotational speed of a DC brushless motor over a wide range of motor supply voltages. An example, of motor rotational speed and current as a function of motor supply voltage is set forth in Table 1.

TABLE 1

| Voltage | Speed (RPM) | Current (Amperes) |
|---------|-------------|-------------------|
| 19 | 3080 | 0.82 |
| 20 | 3180 | 0.86 |
| 21 | 3210 | 0.84 |
| 30 | 3230 | 0.61 |

TABLE 1-continued

| Voltage | Speed (RPM) | Current (Amperes) |
|---------|-------------|-------------------|
| 48 | 3230 | 0.41 |
| 60 | 3230 | 0.35 |

As can be seen from Table 1, over a motor supply voltage range of 20 volts to 60 volts, the rotational speed of a DC brushless motor controlled by the regulator circuit of the present invention is maintained substantially constant (i.e., the rotational speed varies 1.5%) as compared with conventional. As also shown in the Table, the rotational speed of the motor shows no discernible fluctuation over a motor supply voltage range of 30 to 60 volts.

An advantage of employing the above-described voltage mode control for a DC brushless motor is that the control permits a high torque for starting the motor and a narrow speed distribution range for tightly regulating the rotational speed of the motor over a large range of motor supply voltages. A further advantage of applying center tap modulation is that this type of modulation possesses the superior linear transfer characteristics found in full bridge modulation without the drawbacks of full bridge modulation including: the complexity of logic and sequencing of transistor switches, the possibility of cross conduction, and in turn, short circuiting across the input source, difficulty in sensing average motor coil voltage, sensing continuous motor current, and the high parts count inherent in employing full bridge modulation.

The operation of the pwm 150 of FIG. 2 will be explained more fully with reference to FIG. 3. Preferably, the resistors 206, 210 and 212 are selected to be of equal resistance. When the output of the comparator 202 is low, the junction 214 of the resistors 206, 210 and 212 is at ⅓ $V_{cc}$. When the output of the comparator 202 is high, the junction is at ⅔ $V_{cc}$. The timing capacitor 218 is charged and discharged between ⅓ $V_{cc}$ and ⅔ $V_{cc}$ by the timing resistor 216. The frequency of oscillation is primarily a function of the capacitance level of the timing capacitor 218 and the resistance level of the timing resistor 216, and the duty cycle is preferably about 50%. A ramp voltage generated by the timing resistor 216 and the timing capacitor 218 is applied to the non-inverting input of the comparator 302 of the driver sub-circuit 300. When the collector of the driver transistor 308 is low, the pwm switch transistor 130, shown in FIG. 2, is off or non-conducting, and the center tap 110 of the motor 102 is at 0 volts. When the collector of the driver transistor 308 is high, then the pwm switch transistor 130 is on or conducting, and the center tap 110 of the motor 102 is coupled to $V_{in}$.

As can be seen in FIG. 2, there is no filter circuit external of the motor 102 for smoothing the voltage level of the motor supply signal in order to maintain the rotational speed of the motor 102 at a generally constant rpm. The regulator 100 uses the windings 106, 108 of the motor 102 to integrate the pwm voltage and to function similarly to the filter inductor 24 of FIG. 1, and changes in current drawn by the motor 102 are smoothed (i.e., the rotational speed of the motor is maintained substantially constant) by the mass of the rotor 122 in a similar way as the filter capacitor 26 of FIG. 1 smoothes the voltage level of the motor input signal. In other words, the motor inductance is substituted for the filter inductor 24 of FIG. 1, and the rotor mass or inertia is substituted for the filter capacitor 26 of FIG. 1. Thus, the bulky filter inductor 24 and the filter capacitor 26 of FIG. 1 are eliminated in the embodiment of FIG. 2. As a result, the regulator 100 consumes considerably less space than does prior regulators using bulky filter inductors and capacitors. Further, a regulated DC motor or DC fan unit that includes the regulator circuit embodying the present invention also consumes less space because of the elimination of the additional bulky filter components. Accordingly, the regulator circuit 100, or a DC motor or DC fan unit incorporating the regulator embodying the present invention overcomes the space constraints that are found in the prior DC motors or DC fan units using additional filter components.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention.

What is claimed is:

1. A voltage-feedback control circuit for regulating the rotational speed of a DC brushless motor having at least one input terminal, and a motor winding electrically coupled to the at least one input terminal, the voltage-feedback control circuit comprising:

an electrical conduction switch having an input, an output and a control terminal for passing a motor supply signal to the DC brushless motor from a voltage across first and second terminals of a DC voltage source, the input terminal of the switch being coupled to the first terminal of the DC voltage source, and the output terminal of the switch being coupled to the at least one input terminal of the motor and defining a substantially inductorless connection therebetween to thereby allow the motor windings to serve as an inductive filter to smooth changes in the motor current;

a differential (error) amplifier having first and second input terminals and an output terminal for generating a differential signal having a voltage level indicative of the difference between a voltage level corresponding to the motor supply signal and a reference voltage, the first input terminal of the differential amplifier being coupled to a voltage reference, and the second input terminal of the differential amplifier being coupled to the output terminal of the switch; and a pulse-width modulator (pwm) having an input terminal and an output terminal, the input terminal of the pwm being coupled to the output terminal of the differential amplifier and the output terminal of the pwm being coupled to the control terminal of the switch, such that the pwm generates a modulator signal having a pulse width indicative of the voltage level of the differential signal to turn the switch on and off to modulate the motor supply signal and generate a substantially constant selected voltage level to the motor supply signal.

2. A voltage-feedback control circuit as defined in claim 1, wherein the electrical conduction switch is a power transistor.

3. A voltage-feedback control circuit as defined in claim 1, further comprising a voltage adjustment circuit having a control terminal, an input coupled to a DC voltage source, and an output coupled to the first input terminal of the differential amplifier for transmitting an adjustable reference voltage to the first input terminal of the differential amplifier.

4. A voltage-feedback control circuit as defined in claim 1 wherein the pulse width modulator further comprises an oscillator sub-circuit having an input and output, and a driver sub-circuit having an input and output, the input of the oscillator sub-circuit being coupled to a DC voltage source, and the output of the oscillator sub-circuit being coupled to the input of the driver sub-circuit.

5. A voltage-feedback control circuit as defined in claim 4, wherein the driver sub-circuit further comprises a voltage comparator having a first input coupled to the output of the oscillator sub-circuit and a second input coupled to the output of the differential amplifier, whereby the comparator is turned on to drive the pulse width modulator when the voltage level at the output of the oscillator sub-circuit becomes higher than the voltage level at the output of the differential amplifier.

6. A voltage-feedback control circuit as defined in claim 1, further comprising a catch diode coupled between the output terminal of the switch and ground for preventing the voltage at the at least one input terminal of the motor from falling below ground potential when the motor current is being commutated.

7. A voltage-feedback control circuit as defined in claim 1, further comprising:

a voltage averaging circuit having first and second input terminals and an output terminal for averaging the voltage level of the motor supply signal to form an averaged signal, the first input terminal of the voltage averaging circuit being coupled to the output of the switch, and the second input terminal of the voltage averaging circuit being coupled to the second terminal of the voltage source.

8. A voltage-feedback control circuit as defined in claim 7, wherein the voltage averaging circuit further comprises a series connected resistor and capacitor, the resistor and capacitor each having respective first terminals coupled to the first input of the differential amplifier, the resistor having a second terminal coupled to the output of the switch and the capacitor having a second terminal coupled to the second terminal of the DC voltage source.

9. A voltage-feedback control circuit as defined in claim 7, further comprising a voltage reducing circuit interposed between the second input terminal of the differential amplifier and the output terminal of the voltage averaging, circuit.

10. A voltage-feedback control circuit for regulating the rotational speed of a DC brushless motor having at least one input terminal, and a motor winding electrically coupled to the at least one input terminal, the voltage-feedback control circuit comprising:

first means coupled to an electrical power source for switchably passing a motor supply signal to the at least one input terminal of the DC brushless motor and defining a substantially inductorless connection therebetween for allowing the motor windings to serve as an inductive filter to smooth changes in the motor current;

second means coupled to an output of the first means for generating a differential signal having a voltage level indicative of the difference between a voltage level corresponding to the motor supply signal and a reference voltage; and third means for turning, on and off the first means in response to the value of the differential signal in order to provide a substantially constant selected motor supply voltage level.

11. A voltage-feedback control circuit as defined in claim 10, wherein the first means includes an electrical conduction switch having an input, an output and a control terminal for switchably passing the motor supply signal to the at least one input terminal of the DC brushless motor from a voltage across first and second terminals of a DC voltage source, the input terminal of the switch being coupled to the first terminal of the DC voltage source, and the output terminal of the switch being coupled to the at least one input terminal of the DC brushless motor.

12. A voltage-feedback control circuit as defined in claim 10, further comprising fourth means coupled between the first and second means for averaging a voltage level of the motor supply signal and transmitting to the second means an approximately averaged signal of the motor supply signal.

13. A voltage-feedback control circuit as defined in claim 12, wherein the fourth means includes a voltage averaging circuit having first and second input terminals and an output terminal for averaging a voltage level of the motor supply signal, the first input terminal of the voltage averaging circuit being coupled to the output of the switch, and the second terminal of the voltage averaging circuit being coupled to the second terminal of the voltage source.

14. A voltage-feedback control circuit as defined in claim 10, wherein the second means includes a differential (error) amplifier having first and second input terminals and an output terminal for generating a differential signal having a voltage level indicative of the difference between the voltage level corresponding to the motor supply signal and a reference voltage, the first input terminal of the differential amplifier being coupled to a voltage reference, and the second input terminal of the differential amplifier being coupled to the first means.

15. A voltage-feedback control circuit as defined in claim 10, wherein the third means includes a pulse-width modulator (pwm) having an input terminal and an output terminal, the input terminal of the pwm being coupled to the output terminal of the differential amplifier, and the output terminal of the pwm being coupled to the first means such that the pwm generates a modulator signal having a pulse width indicative of the voltage level of the differential signal to turn on and off the first means to thereby provide a substantially constant voltage level of the motor supply signal.

16. A voltage-feedback control circuit as defined in claim 8, further comprising means coupled between an output terminal of the first means and ground for preventing the voltage at the at least one input terminal of the motor from falling below ground potential during commutation of the motor current.

17. A method of regulating the rotational speed of a DC brushless motor having at least one input terminal, and a motor winding electrically coupled to the at least one input terminal, comprising the steps of:
passing motor supply signals from an electrical power source through an electrical conduction switch having an input, an output, and a control terminal, and through a substantially inductorless path extending between the output terminal and the at least one input terminal of the DC brushless motor to thereby allow the motor windings to serve as an inductive filter to smooth changes in the motor current;
generating a differential signal having a voltage level indicative of the difference in voltage between a voltage level corresponding to at least one motor supply signal and a reference voltage; and
modulating the step of passing the motor supply signal in response to the value of the differential signal to provide a substantially constant voltage level of the motor supply signal.

18. A method of regulating as defined in claim 17, further comprising the step of averaging a voltage level of at least one motor supply signal, generating an approximately averaged signal, and generating the differential signal based on the averaged signal.

19. A method of regulating as defined in claim 18, further comprising the step of reducing the voltage level of the averaged signal, and wherein the generating step further comprises generating a voltage level indicative of the difference in voltage between the reduced voltage level of the averaged signal and the reference voltage.

20. A method of regulating as defined in claim 17, further comprising the steps of:
(a) at least one of (i) increasing a pulse width of the motor supply signal to increase the voltage level of the motor supply signal to a selected voltage level corresponding to a selected motor speed; and (ii) decreasing the pulse width of the motor supply signal to decrease the voltage level of the motor supply signal to a selected voltage level corresponding to a selected motor speed; and
(b) modulating the step of passing the motor supply signal in response to the value of the differential signal to provide a substantially constant selected voltage level to maintain the selected motor speed.

* * * * *